US012361878B2

(12) United States Patent
Liu et al.

(10) Patent No.: US 12,361,878 B2
(45) Date of Patent: Jul. 15, 2025

(54) DISPLAY PANEL, DRIVING METHOD OF DISPLAY PANEL, AND DISPLAY DEVICE

(71) Applicant: Xiamen Tianma Display Technology Co., Ltd., Xiamen (CN)

(72) Inventors: Weixing Liu, Xiamen (CN); Ying Sun, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/399,811

(22) Filed: Dec. 29, 2023

(65) Prior Publication Data

US 2024/0135877 A1 Apr. 25, 2024
US 2024/0233640 A9 Jul. 11, 2024

(30) Foreign Application Priority Data

Oct. 7, 2023 (CN) ......................... 202311282263.1

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2320/0233* (2013.01); *G09G 2320/0247* (2013.01); *G09G 2320/0686* (2013.01); *G09G 2330/021* (2013.01); *G09G 2340/0435* (2013.01)

(58) Field of Classification Search
CPC ......... G09G 3/3233; G09G 2300/0819; G09G 2300/0842; G09G 2300/0861; G09G 2320/0233; G09G 2320/0247; G09G 2320/0686; G09G 2330/021; G09G 2340/0435
See application file for complete search history.

(56) References Cited

U.S. PATENT DOCUMENTS

| | | | | | |
|---|---|---|---|---|---|
| 9,704,438 | B2 * | 7/2017 | Lee | G09G 3/3283 | |
| 10,062,326 | B2 * | 8/2018 | Takizawa | G09G 3/3291 | |
| 2015/0348463 | A1 * | 12/2015 | Lee | G09G 3/3233 | 345/212 |
| 2017/0103707 | A1 * | 4/2017 | Park | G09G 3/2003 | |
| 2018/0033372 | A1 * | 2/2018 | Kishi | G09G 3/3233 | |
| 2020/0152129 | A1 * | 5/2020 | Park | G09G 3/3225 | |
| 2020/0160814 | A1 * | 5/2020 | Han | G09G 3/3208 | |
| 2020/0243010 | A1 * | 7/2020 | Lee | G09G 3/3233 | |
| 2021/0110771 | A1 * | 4/2021 | Lee | G09G 3/3258 | |
| 2022/0114943 | A1 * | 4/2022 | Cao | G09G 3/3291 | |
| 2022/0165215 | A1 * | 5/2022 | Lee | G09G 3/3258 | |

(Continued)

*Primary Examiner* — Sejoon Ahn
(74) *Attorney, Agent, or Firm* — KDW Firm PLLC

(57) ABSTRACT

Provided are a display panel, a driving method of a display panel, and a display device. The display panel includes a first display region and a second display region. A working process of the display panel includes a first mode. In the first mode, a data refresh rate of the first display region is F11, a data refresh rate of the second display region is F21, and F11≠F21. In the first mode, a driving parameter of the first display region is different from a driving parameter of the second display region, the driving parameter of the first display region is used for controlling brightness of the first display region, and the driving parameter of the second display region is used for controlling brightness of the second display region.

14 Claims, 9 Drawing Sheets

(56) References Cited

U.S. PATENT DOCUMENTS

| | | | | |
|---|---|---|---|---|
| 2023/0069956 | A1* | 3/2023 | Chen | G09G 3/2092 |
| 2023/0108303 | A1* | 4/2023 | Xie | G09G 3/3233<br>345/690 |
| 2023/0118354 | A1* | 4/2023 | Nose | G09G 3/035<br>345/694 |
| 2024/0231467 | A1* | 7/2024 | Lim | G09G 3/3233 |

* cited by examiner

DISPLAY PANEL, DRIVING METHOD OF DISPLAY PANEL, AND DISPLAY DEVICE

CROSS-REFERENCE TO RELATED APPLICATIONS

This application claims priority to Chinese patent application No. 202311282263.1 filed with the China National Intellectual Property Administration (CNIPA) on Oct. 7, 2023, the disclosure of which is incorporated herein by reference in its entirety.

TECHNICAL FIELD

The present application relates to the field of display technology and, in particular, to a display panel, a driving method of a display panel, and a display device.

BACKGROUND

With the continuous updates of display panel technology, display panels are gradually moving towards lightweight, high screen-to-body ratio and low power consumption.

A dynamic partition refresh display technology is used in the related art, that is, the display panel is divided into multiple partitions, and the refresh rate of each partition can be independently set to reduce the driving power consumption of the display panel. However, in the case of dynamic partition refresh display of the display panel, the refresh rates of different partitions are different, and the brightness of each partition is different, which leads to the non-uniform display of the display panel and affects the display effect of the display panel.

SUMMARY

Embodiments of the present application provide a display panel, a driving method of a display panel, and a display device, which is conducive to improving the display uniformity of the display panel and further improving the display effect of the display panel.

The embodiments of the present application provide a display panel. The display panel includes a first display region and a second display region.

A working process of the display panel includes a first mode.

In the first mode, a data refresh rate of the first display region is F11, a data refresh rate of the second display region is F21, and F11≠F21.

In the first mode, a driving parameter of the first display region is different from a driving parameter of the second display region, the driving parameter of the first display region is used for controlling brightness of the first display region, and the driving parameter of the second display region is used for controlling brightness of the second display region.

Based on the same inventive concept, the embodiments of the present application further provide a display panel. The display panel includes a first display region.

A working process of the display panel includes a first mode and a second mode.

A data refresh rate of the first display region in the first mode is F11, the data refresh rate of the first display region in the second mode is F12, and F11≠F12.

A driving parameter of the first display region in the first mode is different from the driving parameter of the first display region in the second mode, and the driving parameter of the first display region is used for controlling brightness of the first display region.

Based on the same inventive concept, the embodiments of the present application further provide a driving method of a display panel.

The display panel includes a first display region and a second display region. A working process of the display panel includes a first mode. In the first mode, a data refresh rate of the first display region is F11, a data refresh rate of the second display region is F21, and F11≠F21.

The driving method of a display panel includes the step described below.

In the first mode, a driving parameter of the first display region is controlled to be different from a driving parameter of the second display region, where the driving parameter of the first display region is used for controlling brightness of the first display region, and the driving parameter of the second display region is used for controlling brightness of the second display region.

Based on the same inventive concept, the embodiments of the present application further provide a driving method of a display panel.

The display panel includes a first display region. A working process of the display panel includes a first mode and a second mode. A data refresh rate of the first display region in the first mode is F11, the data refresh rate of the first display region in the second mode is F12, and F11≠F12.

The driving method includes the step described below.

A driving parameter of the first display region in the first mode is controlled to be different from the driving parameter of the first display region in the second mode, and the driving parameter of the first display region is used for controlling brightness of the first display region.

Based on the same inventive concept, the embodiments of the present application further provide a display device. The display device includes the display panel described in the embodiments of the first aspect or the second aspect.

BRIEF DESCRIPTION OF DRAWINGS

Other features, objects and advantages of the present application will become more apparent after a detailed description of non-limiting embodiments with reference to the drawings below is read. The same or similar reference numerals denote the same or similar structures. The drawings are not drawn to the actual scale.

DETAILED DESCRIPTION

Figure 1:
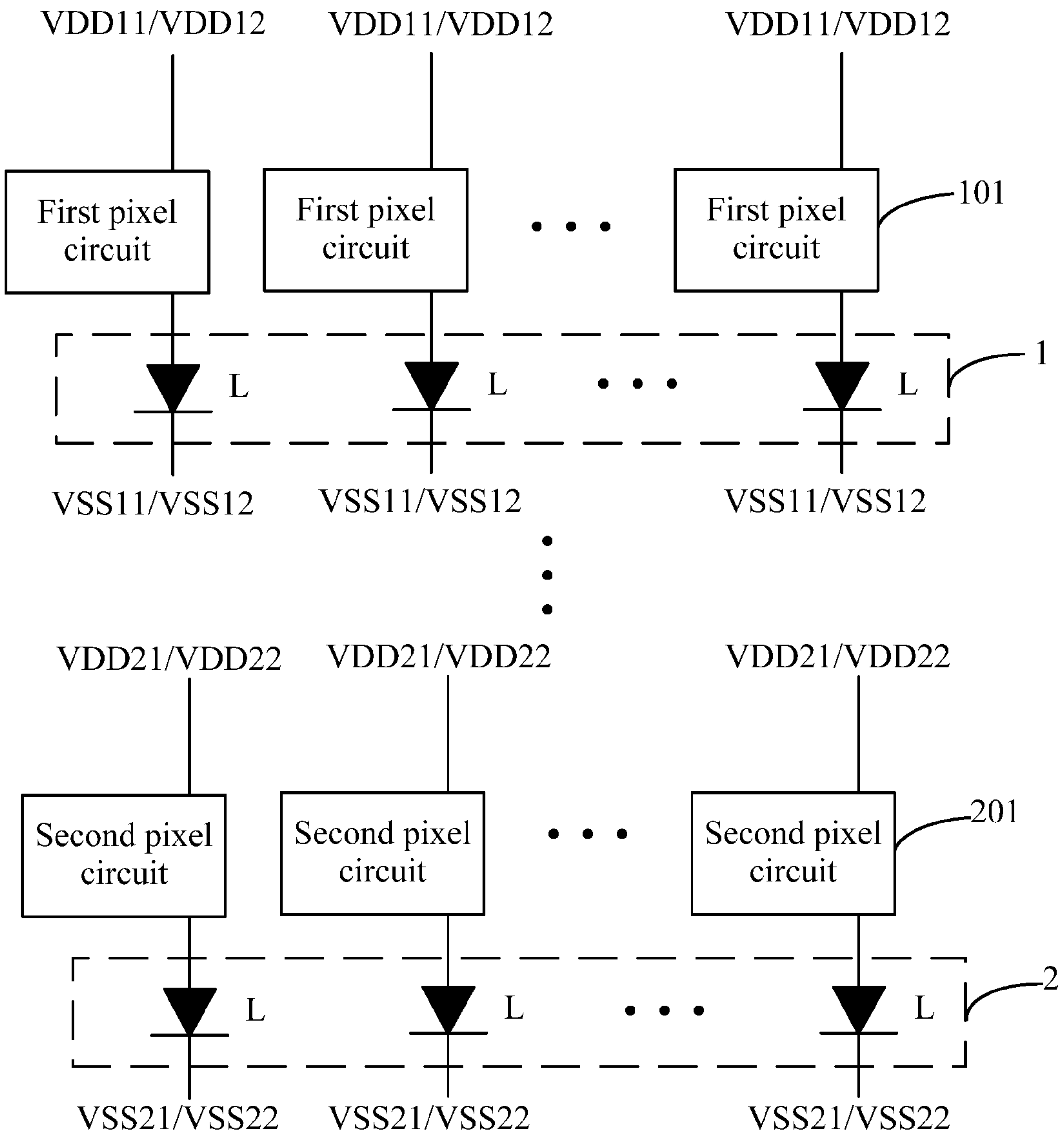
FIG. 1 is a structural diagram of a display panel according to an embodiment of the present application.

Features and example embodiments in various aspects of the present application are described hereinafter in detail. To provide a clear understanding of the objects, technical solutions and advantages of the present application, the present application is further described in detail in conjunction with drawings and embodiments. It is to be understood that the embodiments set forth below are configured to illustrate and not to limit the present application. To those skilled in the art, the present application may be implemented with no need for some of these details. The description of the embodiments hereinafter is intended only to provide better understanding of the present application through examples of the present application.

It is to be noted that herein, relationship terms such as first and second are used merely for distinguishing one entity or operation from another and do not necessarily require or imply any such actual relationship or order between these entities or operations. Furthermore, the term "comprising", "including" or any other variant thereof is intended to encompass a non-exclusive inclusion so that a process, method, article or device that includes a series of elements not only includes the expressly listed elements but also includes other elements that are not expressly listed or are inherent to such a process, method, article or device. In the absence of more restrictions, the elements defined by the statement "including . . . " do not exclude the presence of additional identical elements in the process, method, article or device that includes the elements.

It is to be understood that the term "and/or" used herein merely describes the association relationships between associated objects and indicates that three relationships may exist. For example, A and/or B may indicate three cases: A exists alone, A and B both exist, and B exists alone. In addition, the character "/" herein generally indicates that the front and rear associated objects are in an "or" relationship.

The term "connected" may refer to "electrically connected" or "electrically connected without an intermediate transistor". The term "insulated" may refer to "electrically insulated" or "electrically isolated". The term "driving" may refer to "controlling" or "operating". The term "part of" may refer to "partial". The term "pattern" may refer to "component". The term "end" may refer to "end segment" or "end edge". The display panel may be a display device or a module/part of a display device.

It is apparent for those skilled in the art that various modifications and changes in the present application may be made without departing from the spirit or scope of the present application. Therefore, the present application is intended to cover modifications and variations of the present application that fall within the scope of the corresponding claims (the claimed technical solutions) and their equivalents. It is to be noted that implementations provided in the embodiments of the present application may be combined with one another if there is no contradiction.

Embodiments of the present application provide a display panel, a driving method of a display panel and a display device. Various embodiments of the display panel are described hereinafter in conjunction with the drawings.

The display panel provided in the embodiments of the present application may be an organic light-emitting diode (OLED) display panel, a micro light-emitting diode (microLED) display panel or another type of display panel, which is not particularly limited in the embodiments of the present application.

FIG. 1 is a structural diagram of a display panel according to an embodiment of the present application. As shown in FIG. 1, a display panel includes a first display region 1, a second display region 2 and pixel circuits. The pixel circuits are connected to light-emitting elements L. The pixel circuits receive a positive power supply voltage, and the light-emitting elements L receive a negative power supply voltage.

The pixel circuits may include first pixel circuits 101 and second pixel circuits 201. The positive power supply voltage may include a first positive power supply voltage VDD11/VDD12 and a second positive power supply voltage VDD21/VDD22, the negative power supply voltage may include a first negative power supply voltage VSS11/VSS12 and a second negative power supply voltage VSS21/VSS22. The first pixel circuits 101 may be connected to light-emitting elements L in the first display region 1, and the first pixel circuits 101 may provide drive currents for the light-emitting elements L in the first display region 1. The first pixel circuits 101 may receive the first positive power supply voltage VDD11/VDD12, and the light-emitting elements L in the first display region 1 may receive the first negative power supply voltage VSS11/VSS12. The second pixel circuits 201 may be connected to light-emitting elements L in the second display region 2, and the second pixel circuits 201 may provide drive currents for the light-emitting elements L in the second display region 2. The second pixel circuits 201 may receive the second positive power supply voltage VDD21/VDD22, and the light-emitting elements L in the second display region 2 may receive the second negative power supply voltage VSS21/VSS22.

Figure 2:
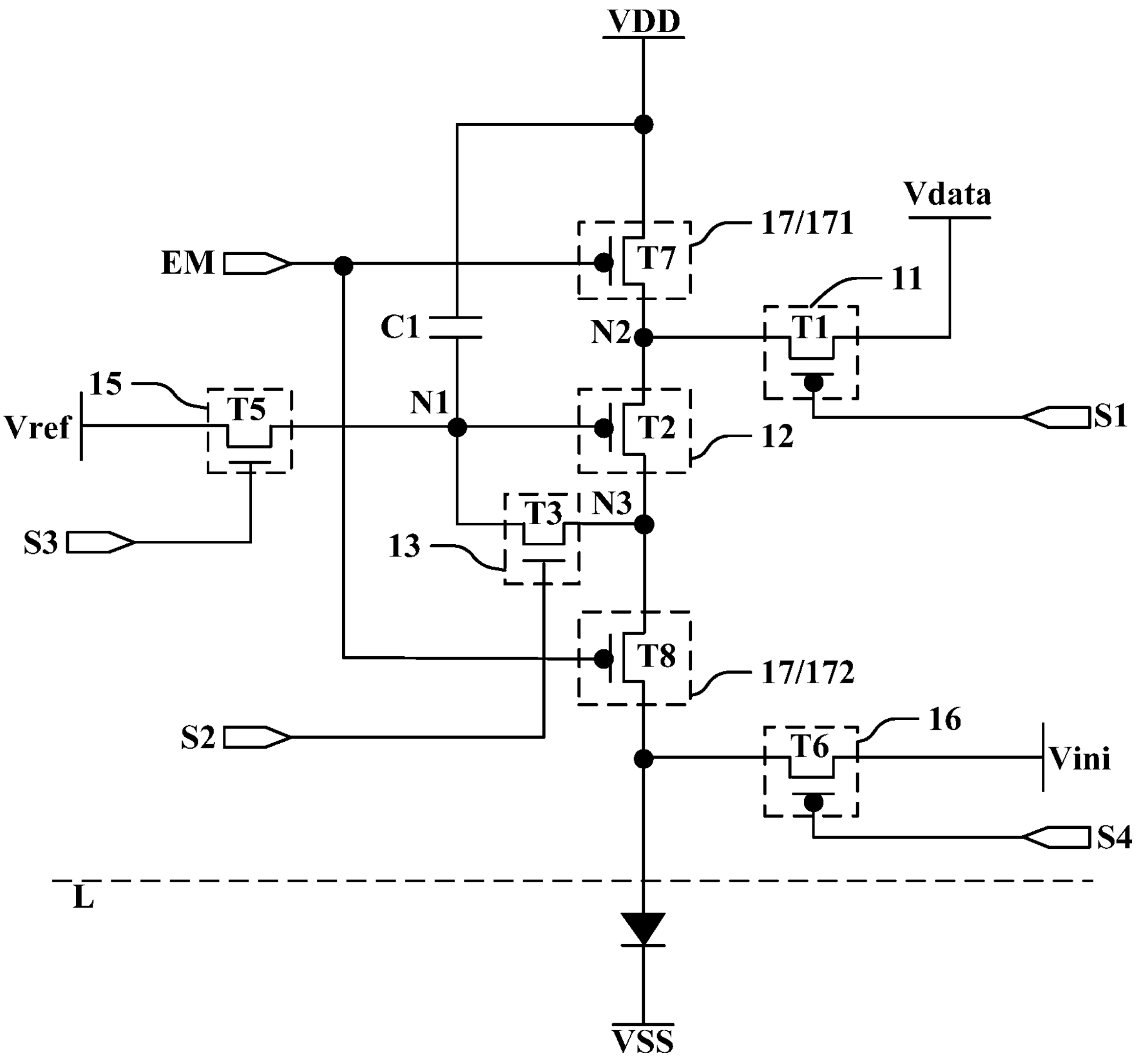
FIG. 2 is another structural diagram of a pixel circuit according to an embodiment of the present application.
Figure 3:
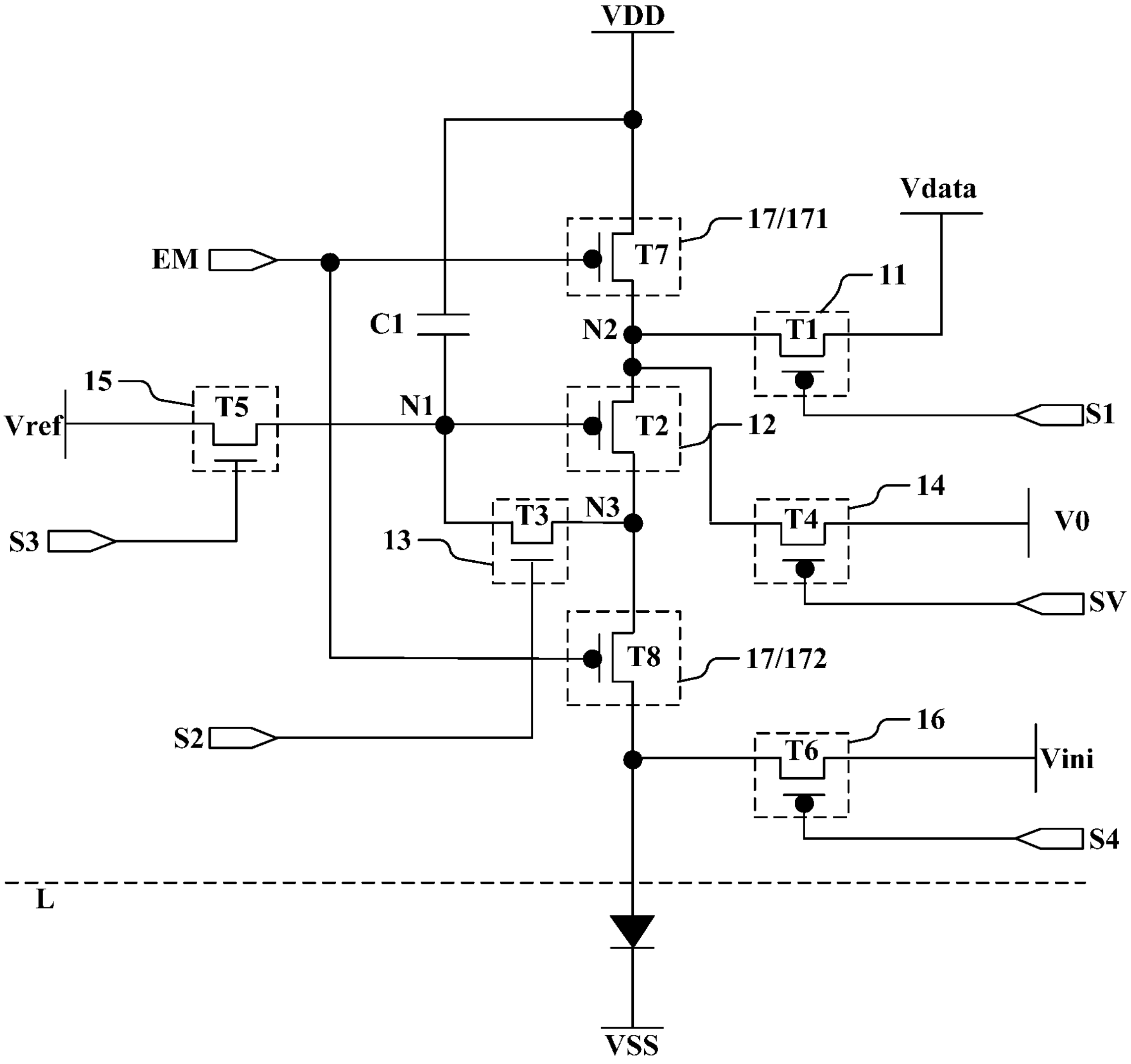
FIG. 3 is another structural diagram of a pixel circuit according to an embodiment of the present application.
Figure 4:
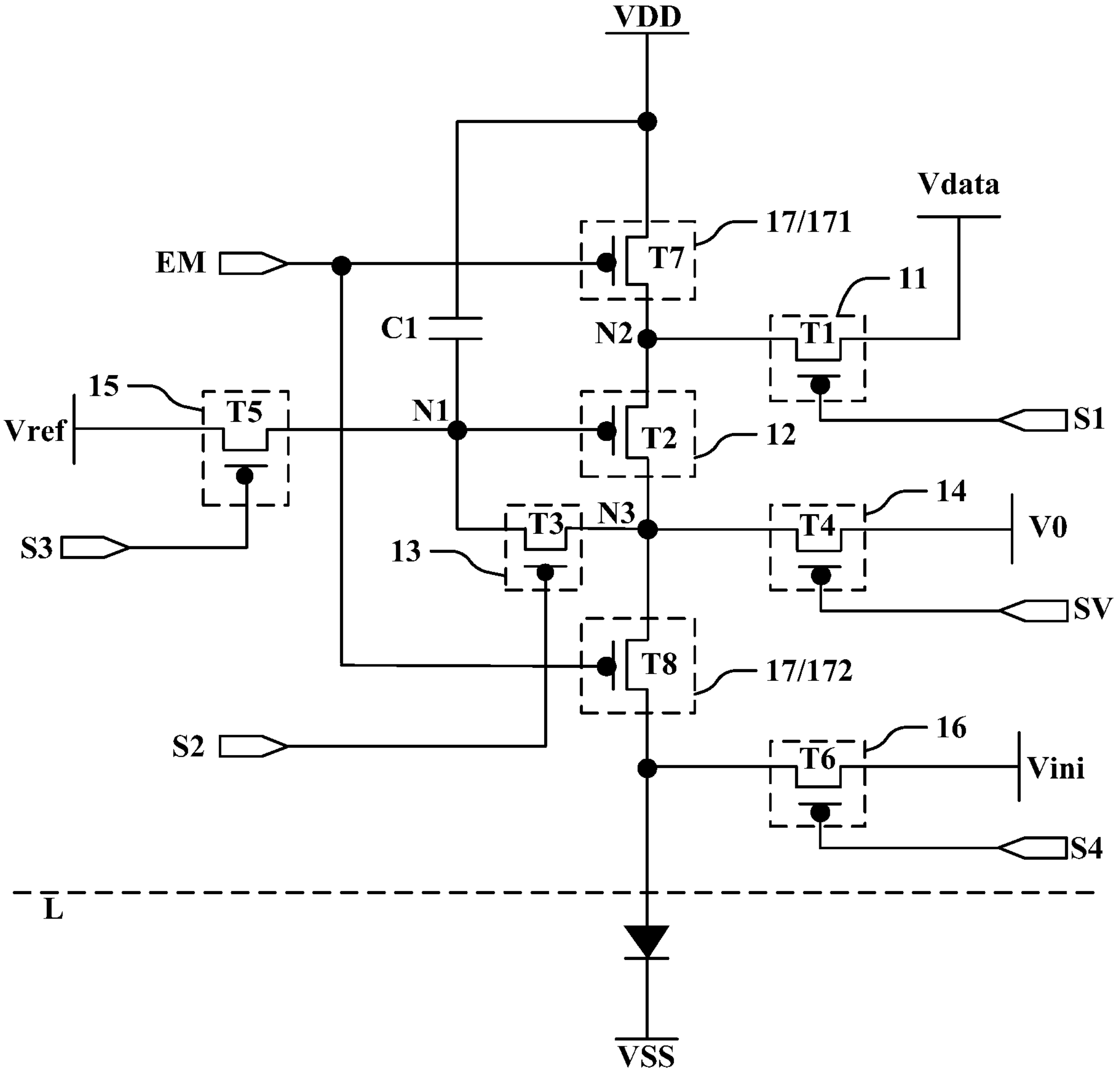
FIG. 4 is another structural diagram of a pixel circuit according to an embodiment of the present application.

In an embodiment, referring to FIG. 2 to FIG. 4, FIG. 2 is another structural diagram of a pixel circuit according to an embodiment of the present application, FIG. 3 is another structural diagram of a pixel circuit according to an embodiment of the present application, and FIG. 4 is another structural diagram of a pixel circuit according to an embodiment of the present application. According to the pixel circuit provided in the embodiments of the present application, the pixel circuit includes a data write module 11, a drive module 12 and a compensation module 13. The drive module 12 includes a drive transistor T2, and the drive transistor T2 is configured to provide a drive current for the light-emitting element L of the display panel 100. The data write module 11 is connected to a first electrode of the drive transistor T2 (that is, a node N2) to provide a data signal Vdata for the drive transistor T2. The compensation module 13 is connected between a gate of the drive transistor (that is, a node N1) and a second electrode of the drive transistor (that is, a node N3) to compensate for a threshold voltage of the drive transistor T2.

In addition, the pixel circuit 10 may further include a reset module 15 for providing a reset signal Vref for the gate of the drive transistor T2, an initialization module 16 for providing an initialization signal Vini for the light-emitting element L and a light emission control module 17 for selectively allowing the light-emitting element L to enter a light emission stage. In an embodiment, the light emission control module 17 includes a first light emission control module 171 and a second light emission control module 172. The first light emission control module 171 is connected between a positive power supply voltage VDD and one electrode of the drive transistor T2. The second light emission control module 172 is connected between the other electrode of the drive transistor T2 and the light-emitting element L.

In the embodiment, a control terminal of the data write module 11 receives a first scan signal S1, and the first scan signal S1 controls the data write module 11 to be turned on or off. A control terminal of the compensation module 13 receives a second scan signal S2, and the second scan signal S2 controls the compensation module 13 to be turned on or off. A control terminal of the reset module 15 receives a third scan signal S3, and the third scan signal S3 controls the reset module 15 to be turned on or off. A control terminal of the initialization module 16 receives a fourth scan signal S4, and the fourth scan signal S4 controls the initialization module 16 to be turned on or off. A control terminal of the light emission control module 17 receives a light emission control signal EM, and the light emission control signal EM controls the light emission control module 17 to be turned on or off.

In addition, in the present embodiment, the data write module 11 includes a data write transistor T1. The first scan signal S1 controls the data write transistor T1 to be turned on or off. The compensation module 13 includes a compensation transistor T3. The second scan signal S2 controls the compensation transistor T3 to be turned on or off. The reset module 15 includes a reset transistor T5. The third scan signal S3 controls the reset transistor T5 to be turned on or off. The initialization module 16 includes an initialization transistor T6. The fourth scan signal S4 controls the initialization transistor T6 to be turned on or off. The first light emission control module 171 includes a first light emission control transistor T7. The second light emission control module 172 includes a second light emission control transistor T8. The light emission control signal EM controls the first light emission control transistor T7 and the second light emission control transistor T8 to be turned on or off.

It is to be noted that as shown in FIG. 3 and FIG. 4, the pixel circuit may further include a bias adjustment module 14 for providing a bias adjustment signal for the drive transistor T2. In an embodiment, as shown in FIG. 3, the bias adjustment module 14 is connected to the first electrode of the drive transistor T2 (that is, the node N2). As shown in FIG. 4, the bias adjustment module 14 is connected to the second electrode of the drive transistor T2 (that is, the node N3). In an embodiment, a control terminal of the bias adjustment module 14 receives a bias adjustment control signal SV, and the bias adjustment control signal SV controls the bias adjustment module 14 to be turned on or off. The bias adjustment module 14 includes a bias adjustment transistor T4, and the bias adjustment control signal SV controls the bias adjustment transistor T4 to be turned on or off.

In addition, it is to be noted that for the pixel circuit shown in FIG. 2 to FIG. 4, the drive transistor T2 is a P-type transistor. The pixel circuit further includes a storage capacitor C1. A first electrode of the storage capacitor C1 is connected to the positive power supply voltage VDD, and a second electrode of the storage capacitor C1 is connected to the gate of the drive transistor T2 for storing a signal transmitted to the gate of the drive transistor T2.

In addition, a second electrode of the light-emitting element is connected to a negative power supply voltage VSS. The drive current is generated through a potential difference between the positive power supply voltage VDD and the negative power supply voltage VSS, thus, driving the light-emitting element to emit light.

In addition, FIG. 2 to FIG. 4 only exemplarily provide several structures of the pixel circuit but do not include all structures. Other pixel circuits of which the data refresh rate satisfies the limitation in the present application belong to the scope of the embodiments of the present application, which is not repeated in this embodiment.

Figure 5:
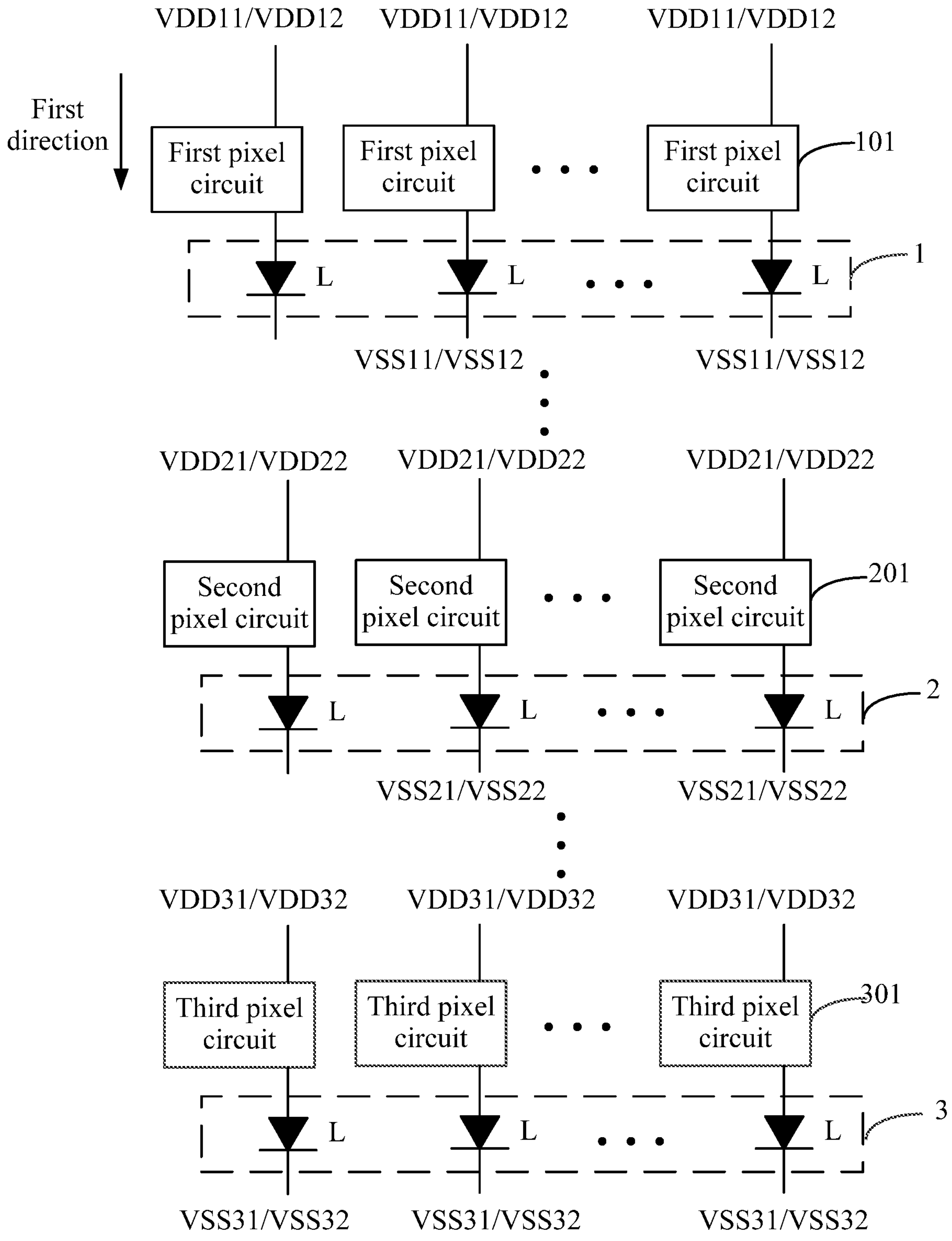
FIG. 5 is another structural diagram of a display panel according to an embodiment of the present application.

FIG. 5 is a diagram illustrating a display scenario of a display panel according to an embodiment of the present application.

As shown in FIG. 5, a working process of the display panel may include a first mode.

In the first mode, a data refresh rate of the first display region 1 is F11, a data refresh rate of the second display region 2 is F21, and F11≠F21.

The data refresh rate refers to the frequency at which a data signal is written into the gate of the drive transistor T2 in the pixel circuit. The higher the data refresh rate, the higher the change frequency of the potential at the gate of the drive transistor T2; conversely, the lower the data refresh rate, the lower the change frequency of the potential at the gate of the drive transistor T2.

In the first mode, a driving parameter of the first display region is different from a driving parameter of the second display region, the driving parameter of the first display region is used for controlling brightness of the first display region, and the driving parameter of the second display region is used for controlling brightness of the second display region.

The display panel has the first display region and the second display region which are different. In the first mode, the first display region and the second display region have different data refresh rates and different driving parameters. By adjusting the driving parameters of different display regions in the same mode, the brightness of the two display regions in the same mode can be changed, which is conducive to improving the display uniformity of the panel display, and thus improving the display effect of the display panel.

Figure 6:
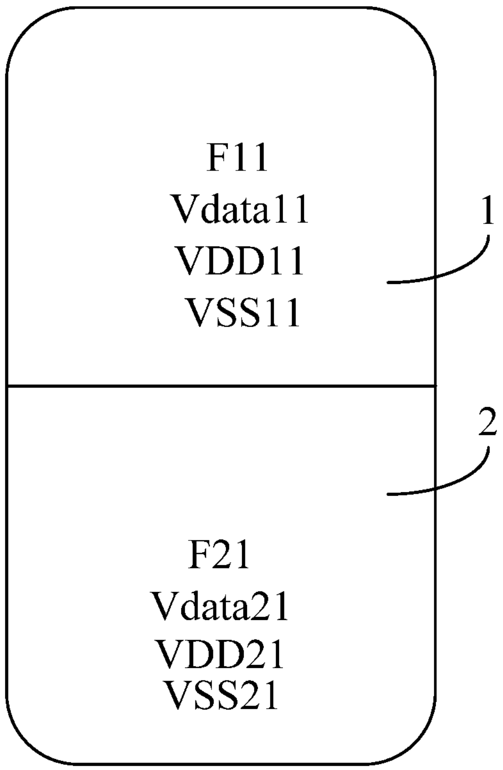
FIG. 6 is a diagram illustrating a display scenario of a display panel according to an embodiment of the present application.

FIG. 6 is a diagram illustrating a display scenario of a display panel according to an embodiment of the present application. In some implementations, as shown in FIG. 6, the driving parameter of the first display region may include a first data voltage, and the driving parameter of the second display region may include a second data voltage.

In the first mode, the first data voltage is Vdata11, the second data voltage is Vdata21, and Vdata11 Vdata21.

It is to be understood that in the case where the drive transistor includes a P-type transistor such as a P-channel metal oxide semiconductor (PMOS) transistor, the larger the data voltage Vdata, the smaller the drive current, and the lower the brightness of the light-emitting element; the smaller the data voltage Vdata, the larger the drive current, and the higher the brightness of the light-emitting element. That is, in the case where the drive transistor includes a P-type transistor, the data voltage Vdata is negatively correlated with the brightness displayed by the display panel.

In the implementation, in the first mode, the brightness of the first display region and/or the second display region in the same mode can be changed by adjusting the first data voltage Vdata11 and/or the second data voltage Vdata12, which is conducive to improving the display uniformity of the display panel and further improving the display effect of the display panel.

In some implementations, F11>F21, and Vdata11>Vdata21; or F11<F21, and Vdata11<Vdata21.

The higher the data refresh rate of the display region, the higher the brightness displayed by the display region. In the related art, the data refresh rate F11 of the first display region is higher than the data refresh rate F21 of the second display region, and the first data voltage Vdata11 of the first display region is equal to the second data voltage Vdata12 of the second display region. At this time, the data refresh rate F11 of the first display region is different from the data refresh rate F21 of the second display region, resulting in different display brightness of the first display region and the second display region, which leads to the non-uniform display of the display panel and affects the display effect of the display panel.

In the implementation, the data refresh rate F11 of the first display region is higher than the data refresh rate F21 of the second display region, that is, the brightness displayed in the first display region is higher than the brightness displayed in the second display region. Additionally, in the case where the drive transistor includes a P-type transistor, the data voltage Vdata is negatively correlated with the brightness displayed by the display panel. Therefore, the first data voltage Vdata11 of the first display region may be increased, and/or the second data voltage Vdata12 of the second display region may be reduced, so that Vdata11>Vdata21, and thus the brightness difference between the first display region and the second display region is reduced, which is conducive to improving the display uniformity of the display panel and thereby improving the display effect of the display panel.

Similarly, the data refresh rate F11 of the first display region is lower than the data refresh rate F21 of the second display region, that is, the brightness displayed in the first display region is lower than the brightness displayed in the second display region. Additionally, in the case where the drive transistor includes a P-type transistor, the data voltage Vdata is negatively correlated with the brightness displayed by the display panel. Therefore, the first data voltage Vdata11 of the first display region may be reduced, and/or the second data voltage Vdata12 of the second display region may be increased, so that Vdata11<Vdata21, and thus the brightness difference between the first display region and the second display region is reduced, which is conducive to improving the uniformity of the display panel and thereby improving the display effect of the display panel.

As an example, the data refresh rate Flt of the first display region is 90 Hz, the data refresh rate F21 of the second display region is 60 Hz, the first data voltage Vdata11 is 4.5 V, and the second data voltage Vdata21 is 4 V.

As another example, the data refresh rate F11 of the first display region is 90 Hz, the data refresh rate F21 of the second display region is 120 Hz, the first data voltage Vdata11 is 4.5 V, and the second data voltage Vdata21 is 5 V.

It is to be understood that the numerical values provided in the embodiments of the present application are only for example purposes and are not intended to limit the present application.

In some implementations, the driving parameter of the first display region may include a first positive power supply voltage, and the driving parameter of the second display region may include a second positive power supply voltage.

In the first mode, the first positive power supply voltage is VDD11, the second positive power supply voltage is VDD21, and VDD11≠VDD21.

The larger the potential difference between the positive power supply voltage VDD and the negative power supply voltage VSS, the larger the drive current, the higher the brightness of the light-emitting element, and the higher the brightness displayed by the display panel. Conversely, the smaller the potential difference between the positive power supply voltage VDD and the negative power supply voltage VSS, the smaller the drive current, the lower the brightness of the light-emitting element, and the lower the brightness displayed by the display panel.

In the implementation, in the first mode, the drive current of the first display region and/or second display region may be changed by adjusting the first positive power supply voltage VDD11 and/or adjusting the second positive power supply voltage VDD21, and thus the brightness of the first display region and/or the brightness of the second display region in the same mode is changed, which is conducive to improving the display uniformity of the display panel and then improving the display effect of the display panel.

In some optional implementations, F11>F21, and VDD11<VDD21.

Alternatively, F11<F21, and VDD11>VDD21.

The higher the data refresh rate of the display region, the higher the brightness displayed by the display region. In the related art, the data refresh rate F11 of the first display region is higher than the data refresh rate F21 of the second display region. The first positive power supply voltage VDD11 of the first display region is equal to the second positive power supply voltage VDD21 of the second display region, and the first negative power supply voltage VSS11 of the first display region is equal to the second negative power supply voltage VSS21 of the second display region. At this time, the data refresh rate F11 of the first display region is different from the data refresh rate F21 of the second display region, resulting in different display brightness of the first display region and the second display region, which leads to the non-uniform display of the display panel and affects the display effect of the display panel.

However, in the present implementation, the data refresh rate F11 of the first display region is higher than the data refresh rate F21 of the second display region, that is, the brightness displayed in the first display region is higher than the brightness displayed in the second display region. The first positive power supply voltage VDD11 of the first display region may be reduced, and/or the second positive power supply voltage VDD21 of the second display region may be increased, so that VDD11<VDD21, thus the drive current of the first display region is reduced, and/or the drive current of the second display region is increased, and thereby the brightness difference between the first display region and the second display region is reduced, which is conducive to improving the display uniformity of the display panel and improving the display effect of the display panel.

Similarly, the data refresh rate F11 of the first display region is lower than the data refresh rate F21 of the second display region, that is, the brightness displayed in the first display region is lower than the brightness displayed in the second display region. The first positive power supply voltage VDD11 of the first display region may be increased, and/or the second positive power supply voltage VDD21 of the second display region may be reduced, so that VDD11>VDD21, thus the drive current of the first display region is increased, and/or the drive current of the second display region is reduced, and thereby the brightness difference between the first display region and the second display region is reduced, which is conducive to improving the display uniformity of the display panel and improving the display effect of the display panel.

As an example, the data refresh rate Flt of the first display region is 90 Hz, the data refresh rate F21 of the second display region is 60 Hz, the first positive power supply voltage VDD11 is 6 V, and the second positive power supply voltage VDD21 is 6.5 V.

As another example, the data refresh rate F11 of the first display region is 90 Hz, the data refresh rate F21 of the second display region is 120 Hz, the first positive power supply voltage VDD11 is 6 V, and the second positive power supply voltage VDD21 is 5.5 V.

In some implementations, the driving parameter of the first display region may include a first negative power supply voltage, and the driving parameter of the second display region may include a second negative power supply voltage.

In the first mode, the first negative power supply voltage is VSS11, the second negative power supply voltage is VSS21, and VSS11≠VSS21.

In the implementation, in the first mode, the drive current of the first display region and/or the drive current of the second display region may be changed by adjusting the first negative power supply voltage VSS11 and/or adjusting the second negative power supply voltage VSS21, and thus the brightness of the first display region and/or the brightness of the second display region in the same mode is changed, which is conducive to improving the display uniformity of the display panel and then improving the display effect of the display panel.

In some implementations, F11>F21, and |VSS11|<|VSS21|.

Alternatively, F11<F21, and |VSS11|>|VSS21|.

The data refresh rate F11 of the first display region is higher than the data refresh rate F21 of the second display region, that is, the brightness displayed in the first display region is higher than the brightness displayed in the second display region. The absolute value of the first negative power supply voltage VSS11 of the first display region may be reduced, and/or the absolute value of the second negative power supply voltage VSS21 of the second display region may be increased, so that |VSS11|<|VSS21|, thus the drive current of the first display region is reduced, and/or the drive current of the second display region is increased, and thereby the brightness difference between the first display region and the second display region is reduced, which is conducive to improving the display uniformity of the display panel and improving the display effect of the display panel.

Similarly, the data refresh rate F11 of the first display region is lower than the data refresh rate F21 of the second display region, that is, the brightness displayed in the first display region is lower than the brightness displayed in the second display region. The absolute value of the first negative power supply voltage VSS11 of the first display region may be increased, and/or the absolute value of the second negative power supply voltage VSS21 of the second display region may be reduced, so that |VSS11|>|VSS21|, thus the drive current of the first display region is increased, and/or the drive current of the second display region is reduced, and thereby the brightness difference between the first display region and the second display region is reduced, which is conducive to improving the display uniformity of the display panel and improving the display effect of the display panel.

As an example, the data refresh rate F11 of the first display region is 90 Hz, the data refresh rate F21 of the second display region is 60 Hz, the first negative power supply voltage VSS11 is −6 V, and the second negative power supply voltage VSS21 is −6.5 V.

As another example, the data refresh rate F11 of the first display region is 90 Hz, the data refresh rate F21 of the second display region is 120 Hz, the first negative power supply voltage VSS11 is −6 V, and the second negative power supply voltage VSS21 is −5.5 V.

Figure 7:
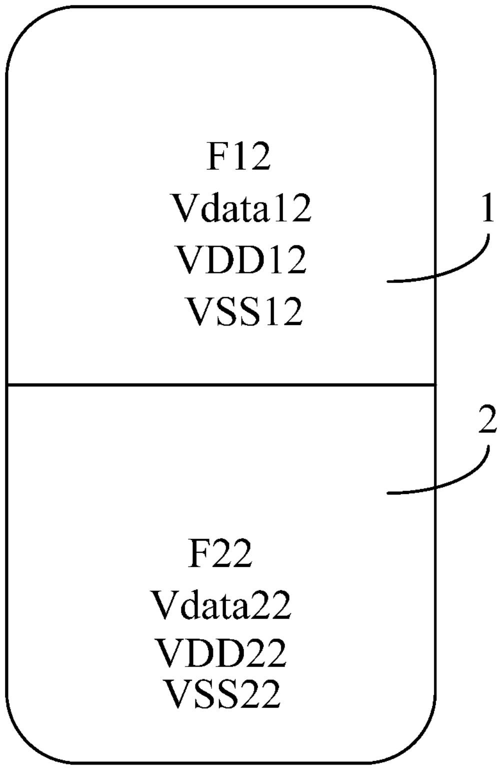
FIG. 7 is a diagram illustrating another display scenario of a display panel according to an embodiment of the present application.

FIG. 7 is a diagram illustrating another display scenario of a display panel according to an embodiment of the present application. In some implementations, as shown in FIG. 7, the working process of the display panel may further include a second mode.

In the second mode, the data refresh rate of the first display region is F12, the data refresh rate of the second display region is F22, F12=F22, and the driving parameter of the first display region is the same as the driving parameter of the second display region.

The first data voltage of the first display region is Vdata12, the second data voltage of the second display region is Vdata22, the first positive power supply voltage of the first display region is VDD12, the second positive power supply voltage of the second display region is VDD22, the first negative power supply voltage of the first display region is VSS12, and the second negative power supply voltage of the second display region is VSS22.

In the second mode, F12=F22, Vdata12=Vdata22, VDD12=VDD22, and VSS12=VSS22. In this manner, the display brightness of the first display region is the same as the display brightness of the second display region, which is conducive to improving the display uniformity of the display panel and thereby improving the display effect of the display panel.

It is to be noted that the working mode of the display panel mentioned in the embodiments of the present application includes the first mode and the second mode, which do not only refer to two working modes of the display panel, but refer to using the first mode and the second mode to represent different working modes of the display panel.

In some implementations, F11≠F12, and F21=F22.

The data refresh rate F11 of the first display region in the first mode is not equal to the data refresh rate F12 of the first display region in the second mode, and the data refresh rate F21 of the second display region in the first mode is equal to the data refresh rate F22 of the second display region in the second mode. In other words, when the working mode is switched from the first mode to the second mode, the data refresh rate of the first display region is increased or reduced, and the data refresh rate of the second display region remains unchanged.

As an example, the data refresh rate F11 of the first display region in the first mode is 90 Hz, the data refresh rate F12 of the first display region in the second mode is 120 Hz, the data refresh rate F21 of the second display region in the first mode is 144 Hz, and the data refresh rate F22 of the second display region in the second mode is still 144 Hz.

As another example, the data refresh rate F11 of the first display region in the first mode is 120 Hz, the data refresh rate F12 of the first display region in the second mode is 90 Hz, the data refresh rate F21 of the second display region in the first mode is 60 Hz, and the data refresh rate F22 of the second display region in the second mode is still 60 Hz.

In some implementations, the driving parameter of the first display region in the first mode is different from the driving parameter of the first display region in the second mode.

The driving parameter of the second display region in the first mode is the same as the driving parameter of the second display region in the second mode.

The first data voltage of the first display region in the first mode is Vdata11, the first data voltage of the first display region in the second mode is Vdata12, the first positive power supply voltage of the first display region in the first mode is VDD11, the first positive power supply voltage of the first display region in the second mode is VDD12, the first negative power supply voltage of the first display region in the first mode is VSS11, and the first negative power supply voltage of the first display region in the second mode is VSS12.

Vdata11≠Vdata12, and/or VDD11≠VDD12, and/or VSS11≠VSS12.

In an embodiment, Vdata11>Vdata12, and/or VDD11<VDD12, and/or |VSS11|<|VSS12|.

In an embodiment, Vdata11<Vdata12, and/or VDD11>VDD12, and/or |VSS11|>|VSS12|.

As an example, Vdata11 is 5 V, Vdata12 is 4 V, VDD11 is 6 V, VDD12 is 7 V, VSS11 is −6 V, and VSS12 is −7 V.

As an example, Vdata11 is 5.5 V, Vdata12 is 5.8 V, VDD11 is 6.5 V, VDD12 is 6.3 V, VSS11 is −6.2 V, and VSS12 is −5.6 V.

The second data voltage of the second display region in the first mode is Vdata21, the second data voltage of the second display region in the second mode is Vdata22, the second positive power supply voltage of the second display region in the first mode is VDD21, the second positive power supply voltage of the second display region in the second mode is VDD22, the second negative power supply voltage of the second display region in the first mode is VSS21, and the second negative power supply voltage of the second display region in the second mode is VSS22.

Vdata21=Vdata22, VDD21=VDD22, and VSS21=VSS22.

Exemplarily, Vdata21=Vdata22=6.7 V, VDD21=VDD22=6.5 V, and VSS21=VSS22=−7 V.

Figure 8:
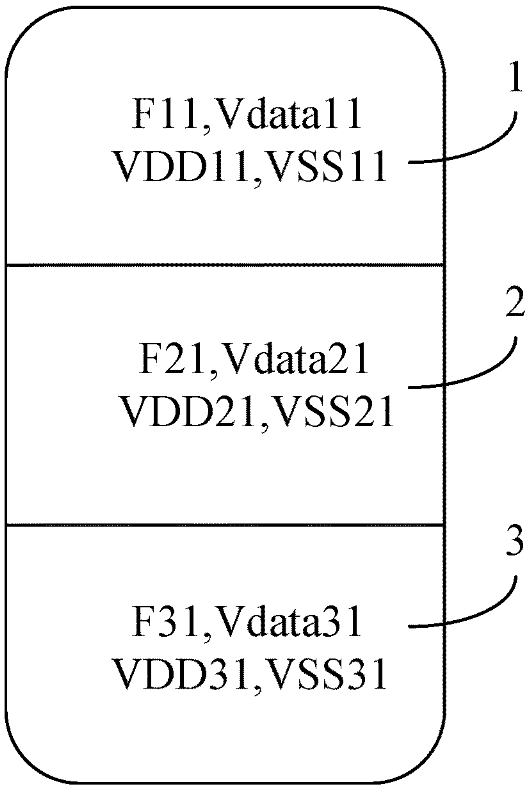
FIG. 8 is a diagram illustrating another display scenario of a display panel according to an embodiment of the present application.

In some implementations, as shown in FIG. 8, the display panel further includes a third display region 3.

As shown in FIG. 5, the pixel circuit may further include third pixel circuits 301. The positive power supply voltage may further include a third positive power supply voltage VDD31/VDD32, and the negative power supply voltage may further include a third negative power supply voltage VSS31/VSS32. The third pixel circuits 301 may be connected to light-emitting elements L in the third display region 3, and the third pixel circuits 301 may provide drive currents for the light-emitting elements L in the third display region 3. The third pixel circuits 301 may receive the third positive power supply voltage VDD31/VDD32, and the light-emitting elements L in the third display region 3 may receive the third negative power supply voltage VSS31/VSS12.

In the first mode, a data refresh rate of the third display region is F31, F31 F11, and F31≠F21.

In the first mode, a driving parameter of the third display region is different from the driving parameter of the second display region and the driving parameter of the first display region, and the driving parameter of the third display region is used for controlling brightness of the third display region.

That is, in the first mode, the data refresh rate F11 in the first display region, the data refresh rate F21 in the second display region, and the data refresh rate F31 in the third display region are different. For example, in the first mode, F11 is 120 Hz, F21 is 90 Hz, and F31 is 144 Hz. For another example, in the first mode, F11 is 90 Hz, F21 is 120 Hz, and F31 is 60 Hz.

The driving parameter of the third display region includes a third data voltage, the third positive power supply voltage, and the third negative power supply voltage.

In the first mode, the third data voltage of the third display region is Vdata31, the third positive power supply voltage and the third negative power supply voltage of the third display region are VDD31 and VSS31, respectively.

Vdata31≠Vdata21, and Vdata31≠Vdata11; VDD31≠VDD21, and VDD31≠VDD11; and VSS31≠VSS21, and VSS31≠VSS11.

Figure 9:
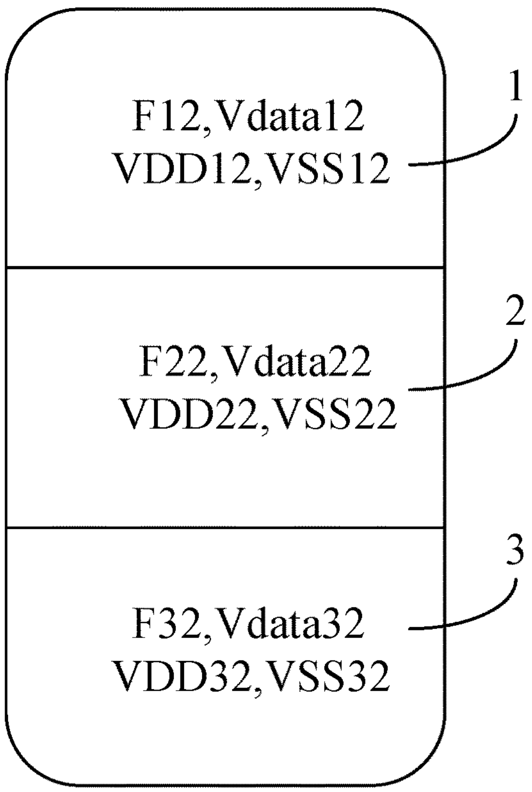
FIG. 9 is a diagram illustrating another display scenario of a display panel according to an embodiment of the present application.

In some implementations, as shown in FIG. 9, a working process of the display panel further includes a second mode.

In the second mode, the data refresh rate of the second display region is F22, the data refresh rate of the third display region is F32, F22=F32, and the driving parameter of the second display region is the same as the driving parameter of the third display region.

In the second mode, the third data voltage of the third display region is Vdata32, the third positive power supply voltage of the third display region is VDD32, and the third negative power supply voltage is VSS32.

Vdata32=Vdata22, VDD32=VDD22, and VSS32=VSS22.

In an embodiment, F32=F22, and F22=F12; Vdata32=Vdata22, and Vdata32=Vdata12; and VDD32=VDD22, and VDD22=VDD12; VSS32=VSS22, and VSS22=VSS12. That is, in the second mode, the data refresh rate of the first display region, the data refresh rate of the second display region and the data refresh rate of the third display region are the same, and the driving parameter of the first display region, the driving parameter of the second display region and the driving parameter of the third display region are the same.

It is to be noted that the embodiments of the present application use the case where the display panel includes the first display region and the second display region and the display panel includes the first display region, the second display region and the third display region as an example for illustration, but not limited thereto. The number of display regions included in the display panel may be set according to the actual situation.

Based on the same inventive concept, an embodiment of the present application further provides a display panel.

Figure 10:
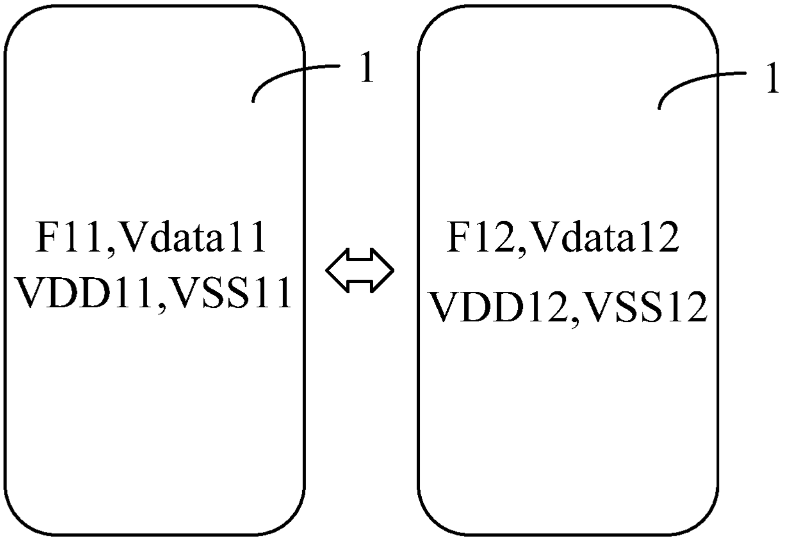
FIG. 10 is a diagram illustrating another display scenario of a display panel according to an embodiment of the present application.

FIG. 10 is a diagram illustrating another display scenario of a display panel according to an embodiment of the present application.

As shown in FIG. 10, the display panel provided in the embodiment of the present application may include a first display region 1.

A working process of the display panel includes a first mode and a second mode.

A data refresh rate of the first display region in the first mode is F11, the data refresh rate of the first display region in the second mode is F12, and F11≠F12.

A driving parameter of the first display region in the first mode is different from the driving parameter of the first display region in the second mode, and the driving parameter of the first display region is used for controlling brightness of the first display region.

The display panel has the first mode and the second mode which are different, and the display panel has different data refresh rates in different modes. The driving parameter in different modes is dynamically adjusted so that the brightness of the same display region in different modes can be changed, which is conducive to alleviating the flicker issue of the display panel, and thus improving the display effect of the display panel.

The driving parameter of the first display region includes a first data voltage, a first positive power supply voltage and a first negative power supply voltage.

The first data voltage of the first display region in the first mode is Vdata11, the first positive power supply voltage of the first display region in the first mode is VDD11, and the first negative power supply voltage of the first display region in the first mode is VSS11. The first data voltage of the first display region in the second mode is Vdata12, the first positive power supply voltage of the first display region in the second mode is VDD12, and the first negative power supply voltage of the first display region in the first mode is VSS12.

$Vdata11 \neq Vdata12$, and/or $VDD11 \neq VDD12$, and/or $VSS11 \neq VSS12$.

As an example, $F11 > F12$, $Vdata11 > Vdata12$, and/or $VDD11 < VDD12$, and/or $|VSS11| < |VSS12|$.

That is to say, when the first display region is switched from the first mode to the second mode, the data refresh rate of the first display region is decreased, and the brightness displayed in the first display region is decreased; at this time, the first data voltage Vdata12 may be reduced, and/or the first positive power supply voltage VDD12 may be increased, and/or the absolute value of the first negative power supply voltage VSS12 may be increased to increase the drive current, thus the brightness displayed in the first display region is improved, and the difference between the brightness displayed in the first display region in the first mode and the brightness displayed in the first display region in the second mode is reduced, which is conducive to alleviating the flicker issue of the display panel, and thus improving the display effect of the display panel.

As an example, $F11 < F12$, $Vdata11 < Vdata12$, and/or $VDD11 > VDD12$, and/or $|VSS11| > |VSS12|$.

That is to say, when the first display region is switched from the first mode to the second mode, the data refresh rate of the first display region is increased, and the brightness displayed in the first display region is increased; at this time, the first data voltage Vdata12 may be increased, and/or the first positive power supply voltage VDD12 may be reduced, and/or the absolute value of the first negative power supply voltage VSS12 may be reduced to reduce the drive current, thus the brightness displayed in the first display region is improved, and the difference between the brightness displayed in the first display region in the first mode and the brightness displayed in the first display region in the second mode is reduced, which is conducive to alleviating the flicker issue of the display panel, and thus improving the display effect of the display panel.

Based on the same inventive concept, an embodiment of the present application further provides a driving method of a display panel.

Figure 11:
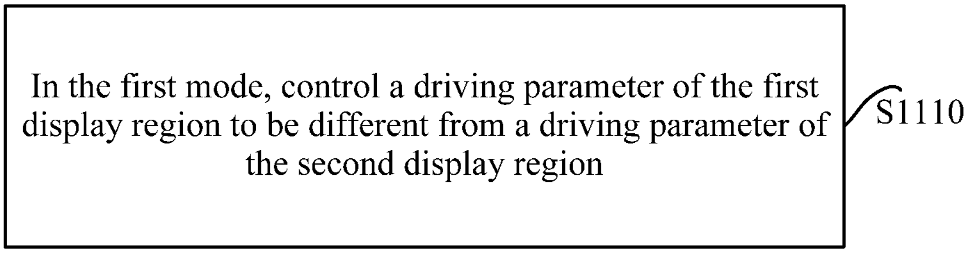
FIG. 11 is a flowchart of a driving method of a display panel according to an embodiment of the present application.

FIG. 11 is a flowchart of a driving method of a display panel according to an embodiment of the present application.

In some implementations, the display panel may include a first display region and a second display region. A working process of the display panel includes a first mode. In the first mode, a data refresh rate of the first display region is F11, and a data refresh rate of the second display region is F21, and $F11 \neq F21$.

As shown in FIG. 11, the driving method may include S1110.

In S1110, in the first mode, a driving parameter of the first display region is controlled to be different from a driving parameter of the second display region, where the driving parameter of the first display region is used for controlling brightness of the first display region, and the driving parameter of the second display region is used for controlling brightness of the second display region.

The display panel has the first display region and the second display region which are different. In the first mode, the first display region and the second display region have different data refresh rates and different driving parameters. By adjusting the driving parameters of different display regions in the same mode, the brightness of the two display regions in the same mode can be changed, which is conducive to improving the display uniformity of the panel display, and thus improving the display effect of the display panel.

The driving method of a display panel provided in the embodiment of the present application has the beneficial effects of the display panel provided in the embodiment of the present application. For details, reference may be made to the description of the display panel in the preceding embodiments, and the details are not repeated here in the embodiment.

Based on the same inventive concept, an embodiment of the present application further provides a driving method of a display panel.

Figure 12:
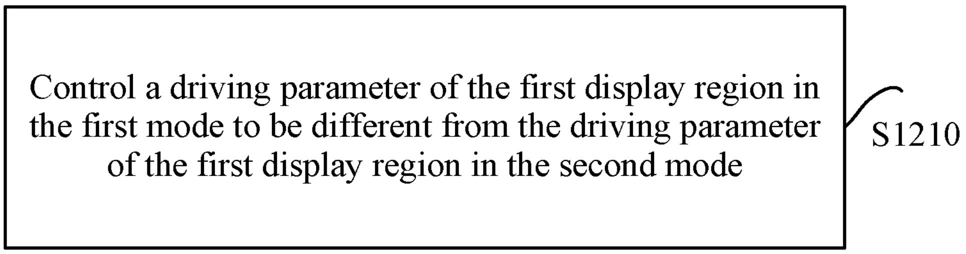
FIG. 12 is a flowchart of another driving method of a display panel according to an embodiment of the present application.

FIG. 12 is a flowchart of another driving method of a display panel according to an embodiment of the present application.

The display panel includes a first display region. A working process of the display panel includes a first mode and a second mode. A data refresh rate of the first display region in the first mode is F11, the data refresh rate of the first display region in the second mode is F12, and $F11 \neq F12$.

As shown in FIG. 12, the driving method may include S1210.

In S1210, a driving parameter of the first display region in the first mode is controlled to be different from the driving parameter of the first display region in the second mode, and the driving parameter of the first display region is used for controlling brightness of the first display region.

The display panel has the first mode and the second mode which are different, and the display panel has different data refresh rates in different modes. The driving parameter in different modes is dynamically adjusted so that the brightness of the same display region in different modes can be changed, which is conducive to alleviating the flicker issue of the display panel, and thus improving the display effect of the display panel.

The driving method of a display panel provided in the embodiment of the present application has the beneficial effects of the display panel provided in the embodiment of the present application. For details, reference may be made to the description of the display panel in the preceding embodiments, and the details are not repeated here in the embodiment.

Figure 13:
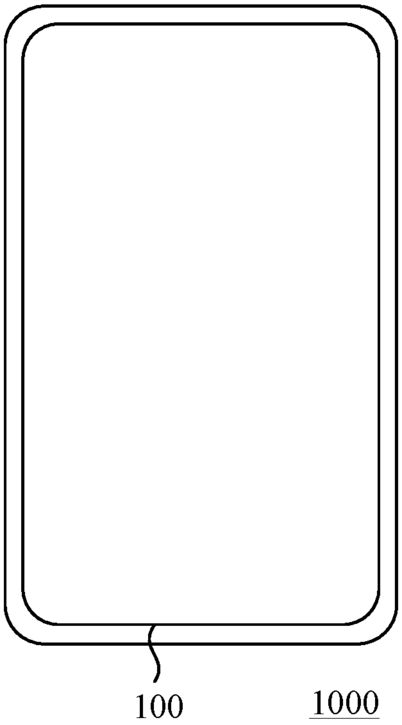
FIG. 13 is a structural diagram of a display device according to an embodiment of the present application.

The present application further provides a display device. The display device includes the display panel provided in the present application. Referring to FIG. 13, FIG. 13 is a structural diagram of a display device according to an embodiment of the present application. A display device 1000 provided in FIG. 13 includes the display panel 100 provided in any one of the preceding embodiments of the present application. In the embodiment of FIG. 13, an example where the display device 1000 is a mobile phone is used for description. It is to be understood that the display device provided in the embodiment of the present application may be a wearable product, a computer, a television, an in-vehicle display device or another display device with a display function, which is not limited in the present application. The display device provided in the embodiment of the present application has the beneficial effects of the display panel according to the embodiments of the present application. For details, reference may be made to the description of the display panel in the preceding embodiments, and the details are not repeated here in the embodiment.

According to the embodiments of the present application as described above, these embodiments do not describe all details, nor do they limit the present application to only the embodiments described. Apparently, many modifications and variations are possible in light of the preceding description. This specification selects and describes these embodiments to better explain the principles and practical applications of the present application so that those skilled in the art can make good use of the present application and the modification based on the present application. The present application is limited only by the claims, along with the full scope and equivalents of the claims.

What is claimed is:

1. A display panel, comprising:

a first display region; and a second display region;

wherein a working process of the display panel comprises a first mode;

in the first mode, a data refresh rate of the first display region is F11, a data refresh rate of the second display region is F21, and F11≠F21;

in the first mode, a driving parameter of the first display region is different from a driving parameter of the second display region, the driving parameter of the first display region is used for controlling brightness of the first display region, and the driving parameter of the second display region is used for controlling brightness of the second display region; and the display panel further comprises a pixel circuit and a light-emitting element, wherein the pixel circuit is connected to the light-emitting element, the pixel circuit is configured to receive a positive power supply voltage, the driving parameter of the first display region comprises a first positive power supply voltage, and the driving parameter of the second display region comprises a second positive power supply voltage; and in the first mode, the first positive power supply voltage is VDD11, the second positive power supply voltage is VDD21, and VDD11≠VDD21;

wherein F11>F21, and VDD11<VDD21; or F11<F21, and VDD11>VDD21.

2. The display panel according to claim 1, wherein the driving parameter of the first display region further comprises a first data voltage, and the driving parameter of the second display region further comprises a second data voltage; and in the first mode, the first data voltage is Vdata11, the second data voltage is Vdata21, and Vdata11≠Vdata21.

3. The display panel according to claim 2, wherein

F11>F21, and Vdata11>Vdata21; or

F11<F21, and Vdata11<Vdata21.

4. The display panel according to claim 1, comprising a light-emitting element, wherein the light-emitting element is configured to receive a negative power supply voltage, the driving parameter of the first display region further comprises a first negative power supply voltage, and the driving parameter of the second display region further comprises a second negative power supply voltage; and in the first mode, the first negative power supply voltage is VSS11, the second negative power supply voltage is VSS21, and VSS11≠VSS21.

5. The display panel according to claim 4, wherein

F11>F21, and |VSS11|<|VSS21|; or

F11<F21, and |VSS11|>|VSS21|.

6. The display panel according to claim 1, wherein the working process of the display panel further comprises a second mode; and in the second mode, the data refresh rate of the first display region is F12, the data refresh rate of the second display region is F22, F12=F22, and the driving parameter of the first display region is the same as the driving parameter of the second display region.

7. The display panel according to claim 6, wherein F11≠F12, and F21=F22.

8. The display panel according to claim 7, wherein the driving parameter of the first display region in the first mode is different from the driving parameter of the first display region in the second mode; and the driving parameter of the second display region in the first mode is the same as the driving parameter of the second display region in the second mode.

9. The display panel according to claim 1, further comprising a third display region; in the first mode, a data refresh rate of the third display region is F31, F31≠F11, and F31≠F21; and in the first mode, a driving parameter of the third display region is different from the driving parameter of the second display region and the driving parameter of the first display region, and the driving parameter of the third display region is used for controlling brightness of the third display region.

10. The display panel according to claim 9, wherein the working process of the display panel further comprises a second mode; and in the second mode, the data refresh rate of the second display region is F22, the data refresh rate of the third display region is F32, F22=F32, and the driving parameter of the second display region is the same as the driving parameter of the third display region.

11. A driving method of a display panel, wherein the display panel comprises a first display region, a second display region, a pixel circuit and a light-emitting element, and a working process of the display panel comprises a first mode; in the first mode, a data refresh rate of the first display region is F11, a data refresh rate of the second display region is F21, and F11≠F21; and the driving method comprises:

in the first mode, controlling a driving parameter of the first display region to be different from a driving parameter of the second display region, wherein the driving parameter of the first display region is used for controlling brightness of the first display region, and the driving parameter of the second display region is used for controlling brightness of the second display region;

wherein the pixel circuit is connected to the light-emitting element, the pixel circuit is configured to receive a positive power supply voltage, the driving parameter of the first display region comprises a first positive power supply voltage, and the driving parameter of the second display region comprises a second positive power supply voltage; and in the first mode, the first positive power supply voltage is VDD11, the second positive power supply voltage is VDD21, and VDD11≠VDD21;

wherein F11>F21, and VDD11<VDD21; or F11<F21, and VDD11>VDD21.

12. A display device, comprising a display panel, wherein the display panel comprises a first display region; and a second display region, and a working process of the display panel comprises a first mode;

in the first mode, a data refresh rate of the first display region is F11, a data refresh rate of the second display region is F21, and F11≠F21;

in the first mode, a driving parameter of the first display region is different from a driving parameter of the second display region, the driving parameter of the first display region is used for controlling brightness of the first display region, and the driving parameter of the second display region is used for controlling brightness of the second display region; and the display panel further comprises a pixel circuit and a light-emitting element, wherein the pixel circuit is connected to the light-emitting element, the pixel circuit is configured to receive a positive power supply voltage, the driving parameter of the first display region comprises a first positive power supply voltage, and the driving parameter of the second display region comprises a second positive power supply voltage; and in the first mode, the first positive power supply voltage is VDD11, the second positive power supply voltage is VDD21, and VDD11=VDD21;

wherein F11>F21, and VDD11<VDD21; or F11<F21, and VDD11>VDD21.

13. The display device according to claim 12, wherein the driving parameter of the first display region further comprises a first data voltage, and the driving parameter of the second display region further comprises a second data voltage; and in the first mode, the first data voltage is Vdata11, the second data voltage is Vdata21, and Vdata11≠Vdata21.

14. The display device according to claim 13, wherein F11>F21, and Vdata11>Vdata21; or F11<F21, and Vdata11<Vdata21.

* * * * *